(12) United States Patent
Peng et al.

(10) Patent No.: US 8,358,507 B2
(45) Date of Patent: Jan. 22, 2013

(54) HARD DRIVE CARRYING DEVICE AND HARD DRIVE BOX THEREOF

(75) Inventors: Cheng-Tzu Peng, Hsinchu (TW);
Hsiang-Chien Liu, Hsinchu (TW);
Chuan-Yi Yeh, Hsinchu (TW);
Chia-Wei Fan, Hsinchu (TW)

(73) Assignee: Promise Technology, Inc., Hsinchu (TW)

( * ) Notice: Subject to any disclaimer, the term of this patent is extended or adjusted under 35 U.S.C. 154(b) by 198 days.

(21) Appl. No.: 13/008,581

(22) Filed: Jan. 18, 2011

(65) Prior Publication Data

US 2012/0104916 A1  May 3, 2012

(30) Foreign Application Priority Data

Oct. 29, 2010 (TW) .............................. 99221031 U

(51) Int. Cl.
*H05K 7/20* (2006.01)
(52) U.S. Cl. .............. 361/726; 361/679.37; 361/679.38; 361/727; 312/223.1; 312/223.2; 312/326
(58) Field of Classification Search ............. 361/679.37, 361/679.38, 726, 727
See application file for complete search history.

(56) References Cited

U.S. PATENT DOCUMENTS

| | | | | |
|---|---|---|---|---|
| 6,378,965 | B1 * | 4/2002 | Reznikov et al. | 312/332.1 |
| 8,009,416 | B2 * | 8/2011 | Kang | 361/679.38 |
| 8,077,467 | B2 * | 12/2011 | Chen et al. | 361/726 |
| 8,087,739 | B2 * | 1/2012 | Chen | 312/332.1 |
| 2011/0101831 | A1 * | 5/2011 | Wang et al. | 312/223.1 |

* cited by examiner

*Primary Examiner* — Anthony Q Edwards
(74) *Attorney, Agent, or Firm* — Muncy, Geissler, Olds & Lowe, PLLC

(57) ABSTRACT

A hard drive carrying device and its hard drive box can fasten a plurality of hard drive boxes in a containing slot of the supporting stand by utilizing simplified mechanism so that a user can rapidly open the locking of the hard drive box by pressing a pressing member to quickly take the hard drive box out from the supporting stand. A hard drive carrying device comprises a supporting stand with a plurality of containing slots, a plurality of hard drive boxes, wherein each hard drive box comprises a main frame, an engaging member and a lock protection member, wherein the lock protection member further comprises a sliding piece, a fastening elastic piece, a pressing member and an elastic member. The device uses the structural design to exactly thin the opening mechanism for the hard drive box to effectively reduce the occupied space so as to increase the actual application.

20 Claims, 7 Drawing Sheets

HARD DRIVE CARRYING DEVICE AND HARD DRIVE BOX THEREOF

BACKGROUND OF THE INVENTION

1. Field of the Invention

The present invention relates to a hard drive carrying device and its hard drive box, and more particularly to a carrying device and its hard drive box for concentratedly placing a plurality of hard drives to integrate the hard drives, thereby achieving systematization.

2. Description of the Related Art

Since technology is rapidly developed, computer system technology is gradually improved. A company usually utilizes computerized management to integrate and control operational resources inside the company and is in widespread use. However, data saved in its inner system may need enormous storage capacity. The demand of storage spaces may not be satisfied in three or five hard drives. A hard drive carrying device which can fasten a plurality of hard drives may be utilized in the system to concentrate storing these hard drives. Simultaneously, hard drives are mutually systematized such that they can be taken as a united storage space.

This type of hard drive carrying device usually comprises a supporting stand. The supporting stand can be placed with a plurality of hard drive boxes. Each hard drive box has a space for carrying a hard drive. In the present technology, the type of hard drive carrying device is that a plurality of inserting slots is disposed at an end of the supporting stand to insert each hard drive box. However, the foregoing technique may not be good enough in the space application. Consequently, the number of carried hard drives is usually limited. In addition, since the conventional hard drive box is fastened in the supporting stand and needs to be easily taken out, a valve of fastening and opening the hard drive box and the supporting stand is disposed to a front end place of the hard drive box. However, the conventional valve usually occupies quite thickness to cause a defect. In the present system, data format and file sizes that need to be saved are more different than before and need more saving spaces. A key issue of reducing the size of a hard drive valve in a limited space to optimize the space arrangement is really important.

SUMMARY OF THE INVENTION

In view of the shortcomings of the prior art, the inventor(s) of the present invention based on years of experience in the related industry to conduct extensive researches and experiments, and finally developed a hard drive carrying device and its hard drive box to overcome the difficulty of conventional technique.

To achieve the foregoing objective, a hard drive carrying device is provided and comprises a supporting stand and a plurality of hard drive boxes. The supporting stand is a long rectangular casing body. A plurality of containing slots, which are vertically and horizontally arranged and mutually spaced at intervals, are disposed to a lateral side wall of the supporting stand; a baffle block is disposed to a side wall of an opening of each containing slot. Each hard drive box is correspondingly disposed in the containing slot, and each hard drive box comprises a main frame, an engaging member and a lock protection member. Wherein, the main frame comprises a front frame plate. The front frame plate has a pivot portion disposed to a first side of a front side of the front frame plate, and a sliding groove recessed at a second side of the front side of the front frame plate. The sliding groove has a first end and a second end, and the first end of the sliding groove approaches the pivot portion more than the second end. Wherein, the engaging member has a pivot end, and the pivot end is correspondingly pivoted to the pivot portion so that the engaging member pivotally rotates on the front frame plate and selectively leans against the front frame plate, and a baffle plate is extended from the pivot end and corresponds to the baffle block. The baffle plate is selectively baffled and limited by the baffle block to fasten the hard drive box in the containing slot. A flexible member is disposed between the engaging member and the front frame plate to provide a flexible restoring force for the engaging member that departs from the front frame plate through pivot rotation. Another end of the engaging member has a buckle block, and the buckle block corresponds to the sliding groove and selectively enters the sliding groove through the engaging member correspondingly pivoting on the pivot portion. A buckling groove is recessed on a side wall surface of the buckle block corresponding to the sliding groove. Wherein, the lock protection member further comprises a sliding piece, a fastening elastic piece, a pressing member and an elastic member. The sliding piece slides in the sliding groove, and a buckle portion protrudes from an end of the sliding piece, and the buckle portion corresponds to the buckling groove and selectively penetrates into the buckling groove to fasten the engaging member. A push member is disposed on an external side of the sliding piece, and a fastening member is disposed to at least one side of the push member. Wherein, the fastening elastic piece is disposed to an exterior side of the sliding piece, and an inner end of the fastening elastic piece is fastened to the first end of the sliding groove. An exterior end of the fastening elastic piece is an elastic piece portion, and at least one via hole and a through hole is disposed on the elastic piece portion. The via hole is provided to permit the fastening member on the sliding piece to penetrate; the through hole is correspondingly fit to the push member and correspondingly penetrated by the buckle block. Wherein, the pressing member is correspondingly disposed to an exterior side of the fastening elastic piece. A push block is disposed on an inner wall surface of the pressing member, in which the push block passes through the through hole of the elastic piece portion, and has an inclination surface correspondingly leaning against the push member. The push member is pushed when the pressing member is pressed by the push block to move toward inside so that the sliding piece moves toward the second end of the sliding groove. Furthermore, at least one locking hole is disposed on the inner wall surface of the pressing member which is correspondingly locked to the fastening member on the sliding piece. Wherein, the elastic member is correspondingly disposed to the second end of the sliding groove, and an elastic end of the elastic member correspondingly leans against the sliding piece.

Wherein, the main frame is a long rectangular frame. The main frame has a hollow portion at its center, and a plurality of receiving pieces protrude around a peripheral wall of the hollow portion to receive a hard drive at the hollow portion. A plurality of fastening holes pass through two side walls of the main frame so that the fastening member passes through the fastening hole to fasten the hard drive set in the hollow portion. At least one fastening aperture is disposed to the first end of the sliding groove, and at least one lock hole is disposed on an inner end of the fastening elastic piece. The lock hole of the fastening elastic piece corresponds to the fastening aperture of the first end of the sliding groove and is passed by at least one fastening member to fasten the fastening elastic piece at the first end of the sliding groove.

At least one fastening aperture is correspondingly disposed at the second end of the sliding groove. At least one locking hole is disposed on the elastic member, and the locking hole of the elastic member corresponds to the fastening aperture at the second end of the sliding groove and is passed by at least one fastening member to fasten the elastic member at the second end of the sliding groove. The engaging member is a long plate body. The flexible member is a torque spring. The fastening elastic piece is a sheet material that is bent at an intermediate section. The push block is allowed to enter a concave opening disposed on the push member.

To further achieve the foregoing objective, a hard drive box is provided and comprises a main frame, an engaging member, and a lock protection member. The main frame comprises a front frame plate. The front frame plate has a pivot portion disposed to a first side of a front side of the front frame plate, and a sliding groove recessed at a second side of the front side of the front frame plate. The sliding groove has a first end and a second end, in which the first end of the sliding groove approaches the pivot portion more than the second end. The engaging member has a pivot end, which is correspondingly pivoted to the pivot portion, so that the engaging member correspondingly pivots on the front frame plate and selectively leans against the front frame plate. A baffle plate is extended from the pivot end, wherein a flexible member is disposed between the engaging member and the front frame plate to provide a flexible restoring force for the engaging member that departs from the front frame plate through a pivot rotation. Another end of the engaging member has a buckle block, which corresponds to the sliding groove and selectively enters the sliding groove through the engaging member correspondingly pivoting on the pivot portion, and a buckling groove on a side wall surface corresponding to the sliding groove. The lock protection member further comprises a sliding piece, a fastening elastic piece, a pressing member and an elastic member. Wherein, the sliding piece correspondingly slides in the sliding groove. A buckle portion protrudes from an end of the sliding piece, and the buckle portion corresponds to the buckling groove and selectively penetrates into the buckling groove to fasten the engaging member. A push member is disposed on an external side of the sliding piece, and a fastening member is disposed to at least one side of the push member. Wherein, the fastening elastic piece is disposed to an exterior side of the sliding piece, and an inner end of the fastening elastic piece is fastened to the first end of the sliding groove. An exterior end of the fastening elastic piece is an elastic piece portion with at least one via hole and a through hole. The via hole is provided to permit the fastening member on the sliding piece to penetrate; the through hole is correspondingly fit to the push member and correspondingly penetrated by the buckle block. Wherein, the pressing member is correspondingly disposed to an exterior side of the fastening elastic piece, and a push block is disposed on an inner wall surface of the pressing member. The push block passes through the through hole of the elastic piece portion, and the push block has an inclination surface correspondingly leaning against the push member. The push member is pushed by the push block when the pressing member is pressed to move toward inside so that the sliding piece moves toward the second end of the sliding groove. Furthermore, at least one locking hole is disposed on the inner wall surface of the pressing member, and the locking hole is correspondingly locked to the fastening member on the sliding piece. Wherein, the elastic member is correspondingly disposed to the second end of the sliding groove, and an elastic end of the elastic member correspondingly leans against the sliding piece.

Wherein, the main frame is a long rectangular frame. The main frame has a hollow portion at its center, and a plurality of receiving pieces protrude around a peripheral wall of the hollow portion to receive a hard drive at the hollow portion. A plurality of fastening holes pass through two side walls of the main frame so that the fastening member passes through the fastening hole to fasten the hard drive set in the hollow portion. At least one fastening aperture is disposed on the first end of the sliding groove, and at least one lock hole is disposed to an inner end of the fastening elastic piece. The lock hole of the fastening elastic piece corresponds to the fastening aperture of the first end of the sliding groove, and is passed by at least one fastening member to fasten the fastening elastic piece at the first end of the sliding groove.

At least one fastening aperture is correspondingly disposed at the second end of the sliding groove, and at least one locking hole is disposed on the elastic member and corresponds to the fastening aperture at the second end of the sliding groove. The locking hole is passed by at least one fastening member to fasten the elastic member at the second end of the sliding groove. The engaging member is a long plate body. The flexible member is a torque spring. The fastening elastic piece is a sheet material that is bent at an intermediate section. The push block is allowed to enter a concave opening disposed on the push member.

In designing the hard drive carrying device, the engaging member can be locked by the lock protection member by utilizing simplified mechanisms. The hard drive box can be fastened in the containing slot of the supporting stand so that a user can rapidly release the locking of the engaging member by simply pressing the pressing member so as to take the hard drive box out from the supporting stand. The device uses the structural design to exactly thin the opening mechanism for the hard drive box to effectively reduce the occupied space, there facilitating the actual application.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
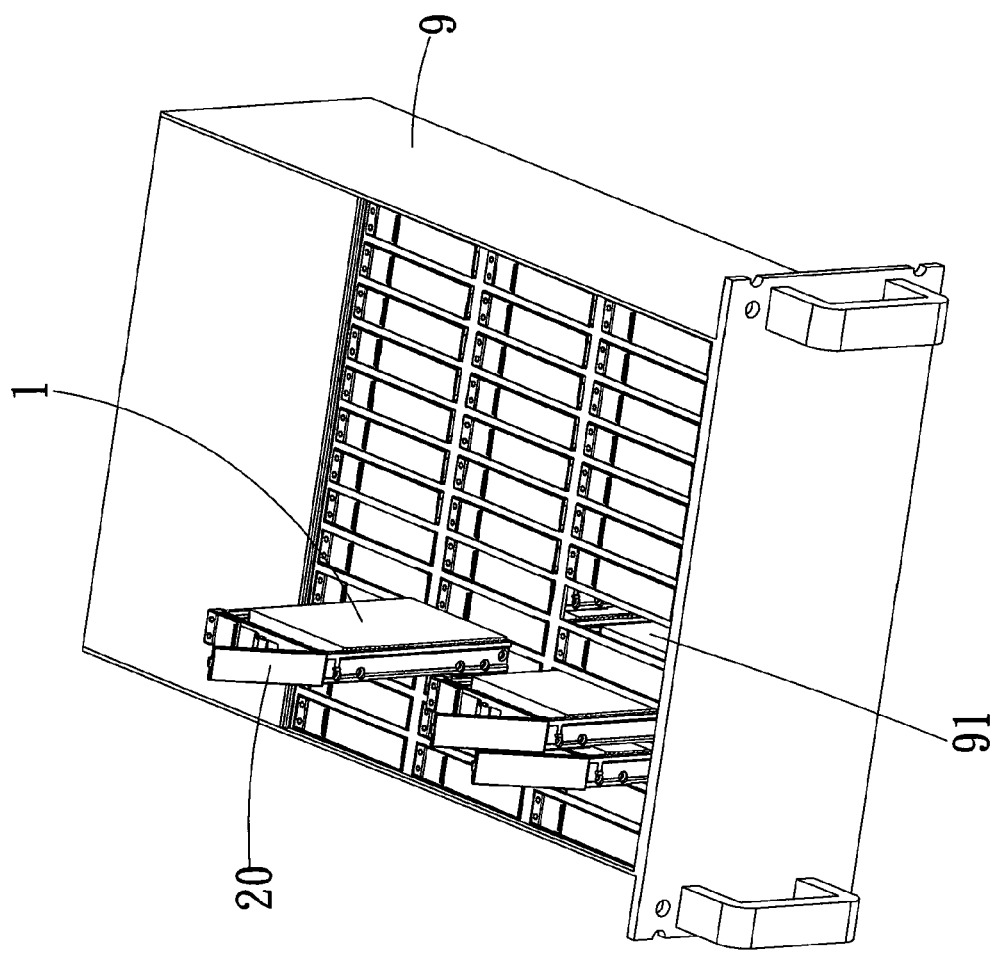
FIG. 1 is a decomposition drawing of a hard drive carrying device and its hard drive box according to the present invention.
Figure 2:
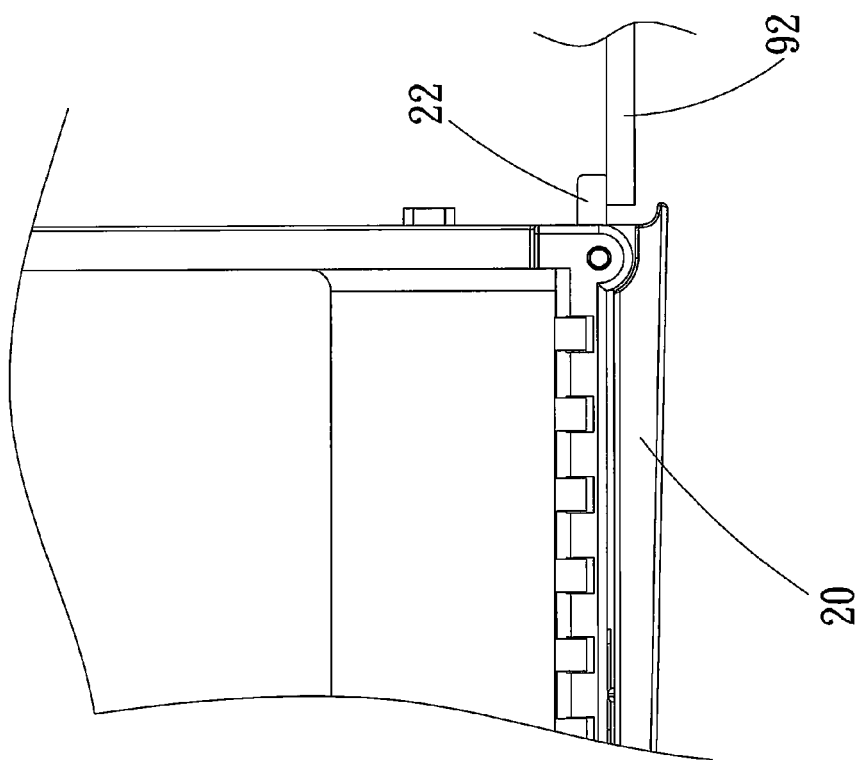
FIG. 2 is a schematic diagram of a hard drive carrying device and its hard drive box according to the present invention.

With reference to FIG. 1 and FIG. 2 for a hard drive carrying device in accordance with a preferred embodiment of the invention, the hard drive carrying device comprises a supporting stand 9 and a plurality of hard drive boxes 1.

The foregoing supporting stand 9 is a long rectangular casing body, in which a plurality of containing slots 91 vertically and horizontally arranged and mutually spaced at intervals are disposed to a lateral side wall of the supporting stand 9, and there is a baffle block 92 at a side wall of an opening of each containing slot 91.

Figure 3:
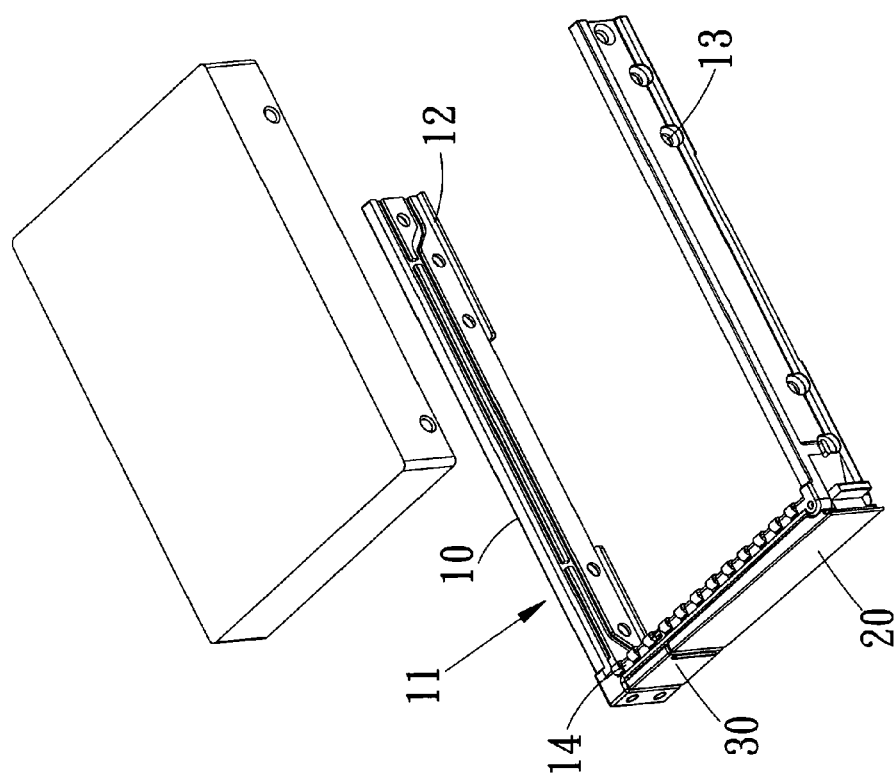
FIG. 3 is an appearance figure of a partial component of a hard drive carrying device and its hard drive box according to the present invention.
Figure 4:
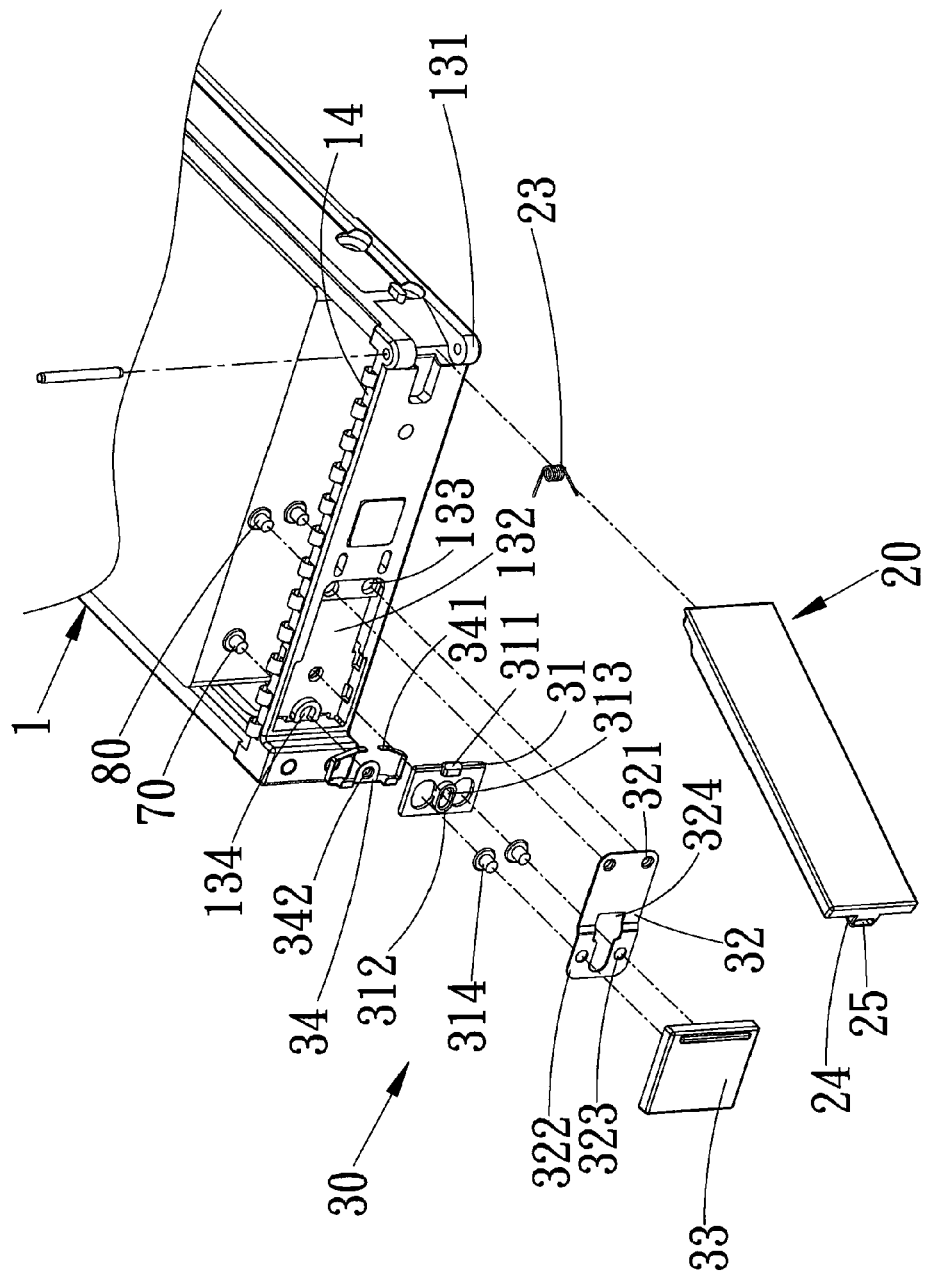
FIG. 4 is a decomposition drawing of a partial component of a hard drive carrying device and its hard drive box according to the present invention.
Figure 5:
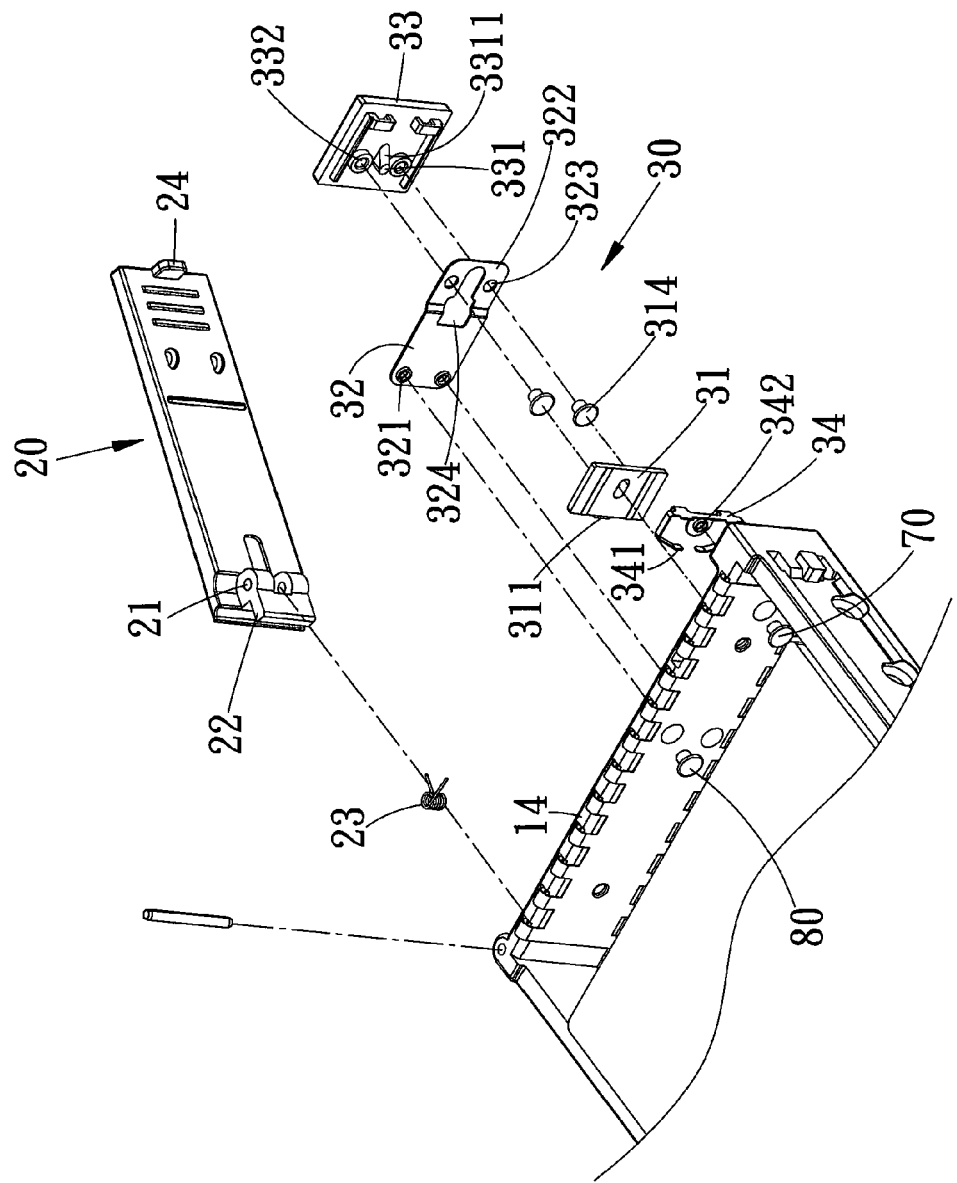
FIG. 5 is a decomposition drawing of a partial component of a hard drive carrying device and its hard drive box according to the present invention.

With reference to FIG. 3 to FIG. 5, the hard drive boxes 1 are correspondingly disposed in the containing slot 91 and can comprise a main frame 10, an engaging member 20 and a lock protection member 30.

The main frame 10 is a long rectangular frame and has a hollow portion 11 at its center. The hollow portion 11 corresponds to a shape of a hard drive, and a plurality of receiving pieces 12 protrude around a peripheral wall of the hollow portion 11 to receive the hard drive at the hollow portion 11. A plurality of fastening holes 13 pass through two side walls of the main frame 10 so that fastening members (not shown in the figure) can pass through the fastening holes 13 to fasten the hard drive set in the hollow portion 11. The main frame 10 comprises a front frame plate 14. A pivot portion 131 is disposed to a first side of a front side of the front frame plate 14, and a sliding groove 132 is recessed at a second side of the front side of the front frame plate 14. At least one fastening aperture 133 is disposed to a first end of the sliding groove 132, and at least one fastening aperture 134 is disposed to a second end of the sliding groove 132.

The engaging member 20 is a rectangular plate body and has a pivot end 21. The pivot end 21 is correspondingly pivoted to the pivot portion 131 so that the engaging member 20 can pivotally rotate on the front frame plate 14 and selectively lean against the front frame plate 14. A baffle plate 22 is extended from the pivot end 21. When the hard drive box 1 is set in the containing slot 91, and the engaging member 20 leans against the front frame plate 14, the baffle plate 22 can be baffled and limited by the baffle block 92 to fasten the hard drive box 1 in the containing slot 91. A flexible member 23 is disposed between the engaging member 20 and the front frame plate 14 to provide a flexible restoring force for the engaging member 20 that departs from the front frame plate 14 through the pivot rotation. The flexible member 23 can be a torque spring. Another end of the engaging member 20 has a buckle block 24. The buckle block 24 corresponds to the sliding groove 132 and selectively enters the sliding groove 132 through the engaging member 20 correspondingly pivoting on the pivot portion 131. A buckling groove 25 is disposed on a side wall surface of the buckle block 24 corresponding to the sliding groove 132.

The lock protection member 30 further comprises a sliding piece 31, a fastening elastic piece 32, a pressing member 33 and an elastic member 34.

The sliding piece 31 can slide in the sliding groove 132, and a buckle portion 311 protrudes from an end of the sliding piece 31. The buckle portion 311 corresponds to the buckling groove 25 and selectively passes through the buckling groove 25 to form a fastening relationship with the engaging member 20 so as to lock the engaging member 20. A push member 312 is disposed on an external surface of the sliding piece 31. A concave opening 313 can be selectively disposed on the push member 312, and a fastening member 314 is disposed to at least one side of the push member 312. An extending end of the fastening member 314 is extended outward.

The fastening elastic piece 32 is a sheet material that is bent at an intermediate section and disposed to an exterior side of the sliding piece 31. At least one lock hole 321 is disposed on an inner end of the fastening elastic piece 32. The lock hole 321 corresponds to the fastening aperture 133 and is passed by the fastening member 80 to fasten the fastening elastic piece 32 at the first end of the sliding groove 132. An exterior end of the fastening elastic piece 32 is an elastic piece portion 322. At least one via hole 323 is disposed on the elastic piece portion 322. The via hole 323 is provided to permit the fastening member 314 on the sliding piece 31 to penetrate. A through hole 324 is disposed on the elastic piece portion 322. The through hole 324 is correspondingly fit to the push member 312 and correspondingly passed by the buckle block 24.

The pressing member 33 is correspondingly disposed to an exterior place of the fastening elastic piece 32. A push block 331 is disposed on an inner wall surface of the pressing member 33. The push block 331 can pass through the through hole 324 of the elastic piece portion 322 and correspondingly can pass through the concave opening 313 of the push member 312. The push block 331 has an inclination surface 3311. The inclination surface 3311 correspondingly leans against the push member 312, and the push member 312 is pushed when the pressing member 33 is pressed to move toward inside so that the sliding piece 31 moves toward the second end of the sliding groove 132. Simultaneously, the buckle portion 311 comes off the buckling groove 25 to unlock the engaging member 20. At least one locking hole 332 is further disposed on the inner wall surface of the pressing member 33. The locking hole 332 is correspondingly locked to the fastening member 314 on the sliding piece 31 so that the sliding piece 31, the fastening elastic piece 32 and the pressing member 33 are mutually fastened.

The elastic member 34 is correspondingly disposed to the second end of the sliding groove 132. An elastic end 341 of the elastic member 34 correspondingly leans against the sliding piece 31 to provide an elastic restoring force for the sliding piece 31 that is toward the first end of the sliding groove 132. A locking hole 342 is disposed on the elastic member 34. The locking hole 342 corresponds to the fastening hole 134 and is passed by a fastening member 70 to fasten the elastic member 34 at the second end of the sliding groove 132.

Figure 6:
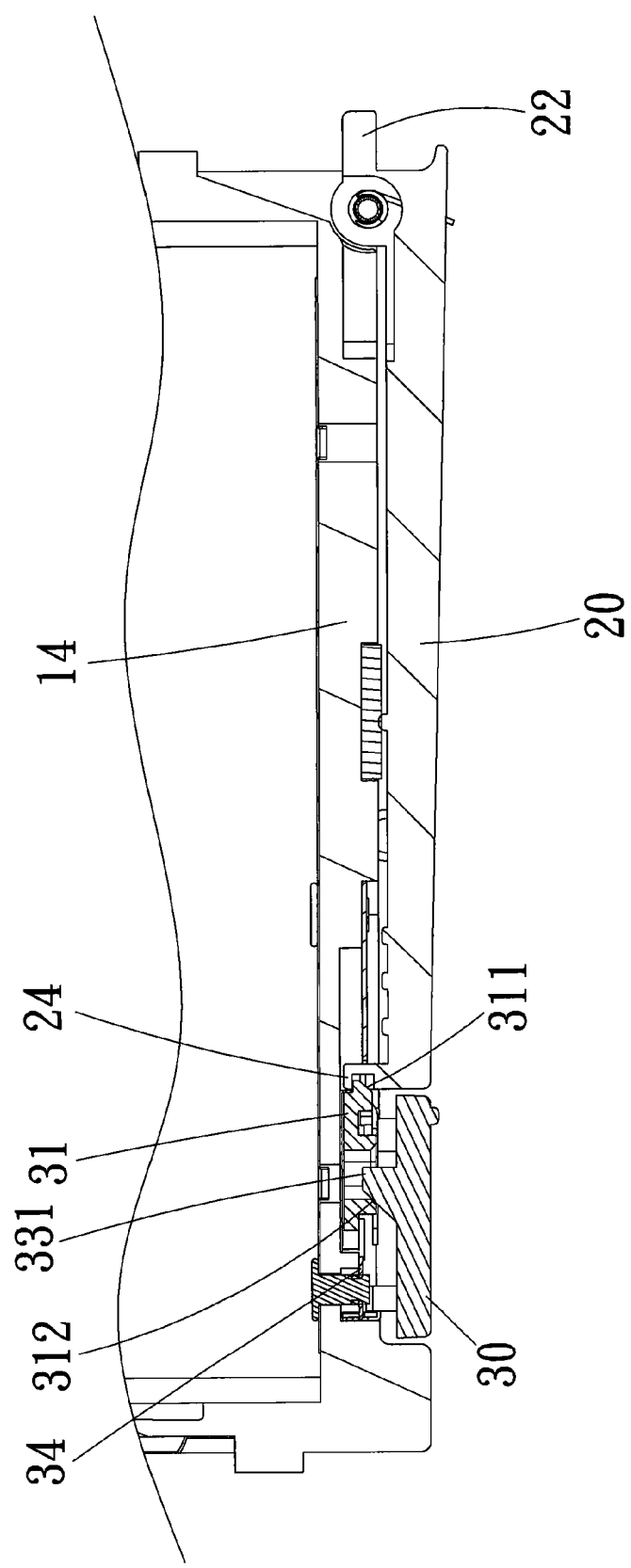
FIG. 6 is a schematic diagram of a hard drive carrying device and its hard drive box according to the present invention.
Figure 7:
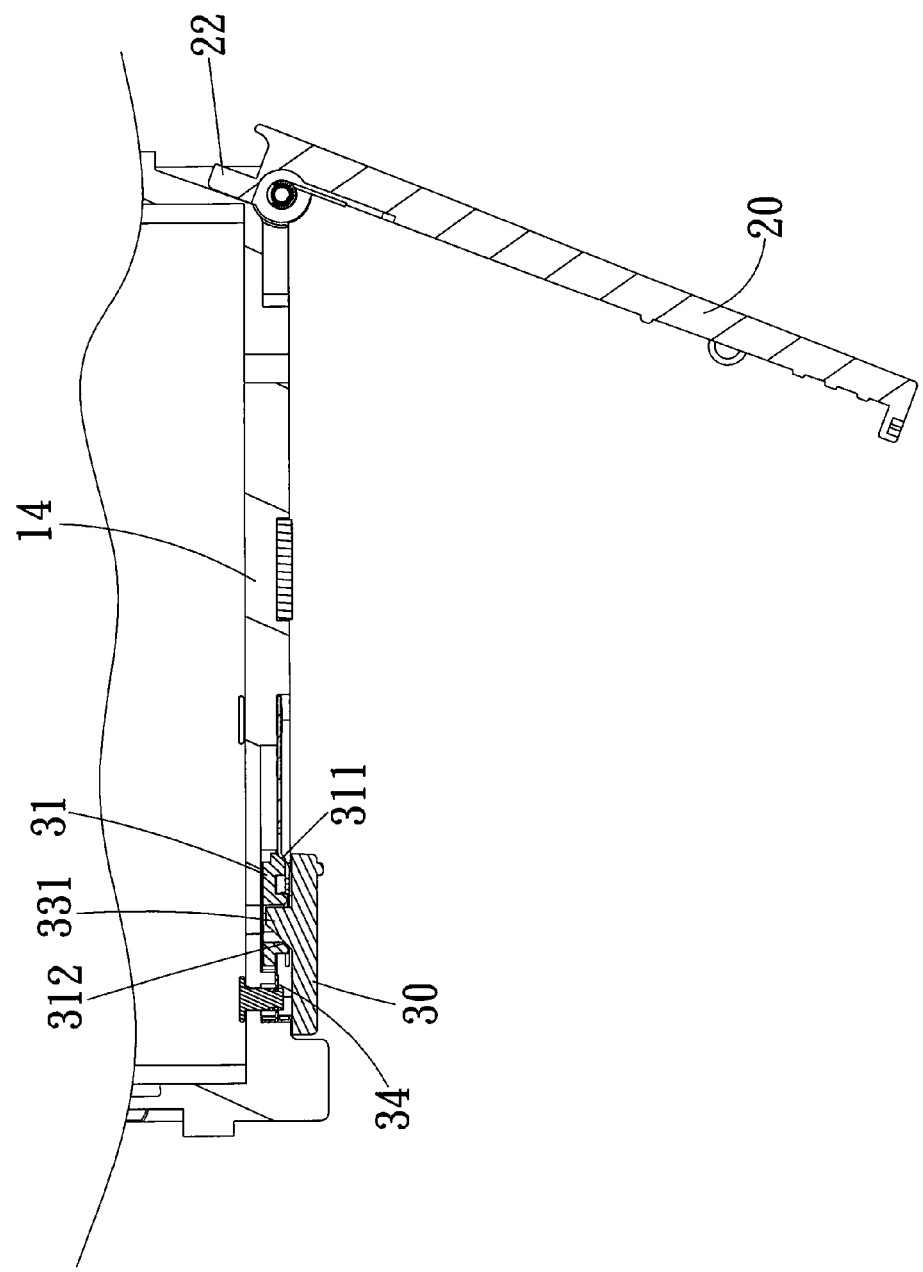
FIG. 7 is a schematic diagram of a hard drive carrying device and its hard drive box according to the present invention.

With reference to FIG. 6 and FIG. 7, the design of the hard drive carrying device can be diversity. The engaging member 20 can be locked by the lock protection member 30 by utilizing the simplified mechanism so that the hard drive box 1 can be locked and fastened in the containing slot 91 of the supporting stand 9. A user can rapidly open the locking of the engaging member 20 by pressing the pressing member 33 so that the hard drive box 1 can be taken out from the supporting stand 9. The invention utilizes the structural design to exactly thin the opening mechanism for the hard drive box 1 to effectively reduce the occupied space. Since the hard drive box 1 is inserted into a side of the supporting stand 9, the supporting stand 9 is allowed to increase the quantity of hard drives carried in the limited space and facilitates the actual application to increase the convenience.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A hard drive carrying device comprising:
   a supporting stand being a rectangular casing body, and having a plurality of containing slots, which are vertically and horizontally arranged and mutually spaced at intervals, disposed on a lateral side wall of the supporting stand, and a baffle block disposed on a side wall of an opening of each containing slot; and a plurality of hard drive boxes, wherein each hard drive box is correspondingly disposed in the containing slot, and each hard drive box comprises a main frame, an engaging member and a lock protection member; wherein the main frame comprises a front frame plate, which has a pivot portion disposed on a first side of a front side of the front frame plate, and has a sliding groove recessed at a second side of the front side of the front frame plate, and the sliding groove has a first end and a second end, and the first end of the sliding groove approaches the pivot portion more than the second end;

wherein the engaging member has a pivot end, and the pivot end is correspondingly pivoted to the pivot portion so that the engaging member pivotally rotate on the front frame plate and selectively leans against the front frame plate, and a baffle plate is extended from the pivot end and corresponds to the baffle block, and the baffle plate is selectively baffled and limited by the baffle block to fasten the hard drive box in the containing slot, and a flexible member is disposed between the engaging member and the front frame plate to provide a flexible restoring force for the engaging member that departs from the front frame plate through pivot rotation, and the engaging member has a buckle block on another end, and the buckle block corresponds to the sliding groove and selectively enters the sliding groove through the engaging member correspondingly pivoting on the pivot portion, and a buckling groove is disposed on a side wall surface of the buckle block corresponding to the sliding groove;

wherein the lock protection member further comprises a sliding piece, a fastening elastic piece, a pressing member and an elastic member; wherein the sliding piece slides in the sliding groove, and a buckle portion protrudes from an end of the sliding piece, and the buckle portion corresponds to the buckling groove and selectively passes through the buckling groove to fasten the engaging member, and a push member is disposed to an external side of the sliding piece, and a fastening member is disposed to at least one side of the push member;

wherein the fastening elastic piece is disposed to an exterior side of the sliding piece, and an inner end of the fastening elastic piece is fastened to the first end of the sliding groove, and an exterior end of the fastening elastic piece is an elastic piece portion, and at least one via hole is disposed on the elastic piece portion, and the via hole is provided to permit the fastening member on the sliding piece to penetrate, and a through hole is disposed on the elastic piece portion, and the through hole is correspondingly fit to the push member and correspondingly penetrated by the buckle block;

wherein the pressing member is correspondingly disposed to an exterior side of the fastening elastic piece, and a push block is disposed on an inner wall surface of the pressing member, and the push block passes through the through hole of the elastic piece portion, and the push block has an inclination surface, and the inclination surface correspondingly leans against the push member, and the push member is pushed when the pressing member is pressed to move toward inside so that the sliding piece moves toward the second end of the sliding groove, and at least one locking hole is further disposed to the inner wall surface of the pressing member, and the locking hole is correspondingly locked to the fastening member on the sliding piece;

wherein the elastic member is correspondingly disposed to the second end of the sliding groove, and an elastic end of the elastic member correspondingly leans against the sliding piece.

2. The hard drive carrying device as recited in claim 1, wherein the main frame is a long rectangular frame.

3. The hard drive carrying device as recited in claim 1, wherein a hollow portion is disposed to a center of the main frame, and a plurality of receiving pieces protrudes around a peripheral wall of the hollow portion to receive a hard drive at the hollow portion.

4. The hard drive carrying device as recited in claim 3, wherein a plurality of fastening holes are disposed on two side walls of the main frame so that the fastening member passes through one of the plurality of fastening holes to fasten the hard drive set in the hollow portion.

5. The hard drive carrying device as recited in claim 1, wherein at least one fastening aperture is disposed on the first end of the sliding groove, and at least one lock hole is disposed on an inner end of the fastening elastic piece, and the lock hole corresponds to the fastening aperture of the first end of the sliding groove and is passed by the at least one fastening member to fasten the fastening elastic piece at the first end of the sliding groove.

6. The hard drive carrying device as recited in claim 1, wherein at least one fastening aperture is correspondingly disposed on the second end of the sliding groove, and the at least one locking hole is disposed to the elastic member, and the locking hole corresponds to the fastening aperture of the second end of the sliding groove and is passed by at least one fastening member to fasten the elastic member at the second end of the sliding groove.

7. The hard drive carrying device as recited in claim 1, wherein the engaging member is a rectangular plate body.

8. The hard drive carrying device as recited in claim 1, wherein the flexible member is a torque spring.

9. The hard drive carrying device as recited in claim 1, wherein the fastening elastic piece is a sheet material that is bent at an intermediate section.

10. The hard drive carrying device as recited in claim 1, wherein a concave opening is disposed on the push member to permit the push block to enter the push member.

11. A hard drive box comprising:

a main frame comprising a front frame plate, which has a pivot portion disposed on a first side of a front side of the front frame plate, and has a sliding groove recessed at a second side of the front side of the front frame plate, wherein the sliding groove has a first end and a second end, and the first end of the sliding groove approaches the pivot portion more than the second end;

an engaging member having a pivot end correspondingly pivoting to the pivot portion so that the engaging member correspondingly pivots on the front frame plate and selectively leaning against the front frame plate, a baffle plate extended from the pivot end, a flexible member disposed between the engaging member and the front frame plate to provide a flexible restoring force for the engaging member that departs from the front frame plate through a pivot rotation, a buckle block on another end of the engaging member which corresponds to the sliding groove and selectively enters the sliding groove through the engaging member correspondingly pivoting on the pivot portion, and a buckling groove disposed on a side wall surface of the buckle block corresponding to the sliding groove; and a lock protection member further comprising a sliding piece, a fastening elastic piece, a pressing member and an elastic member; wherein the sliding piece correspondingly slides in the sliding groove, and a buckle portion protrudes from an end of the sliding piece, and the buckle portion corresponds to the buckling groove and selectively passes through the buckling groove to fasten the engaging member, and a push member is disposed to an external side of the sliding piece, and a fastening member is disposed to at least one side of the push member;

wherein the fastening elastic piece is disposed to an exterior side of the sliding piece, and an inner end of the fastening elastic piece is fastened to the first end of the sliding groove, and an exterior end of the fastening elastic piece is an elastic piece portion, and at least one via hole is disposed on the elastic piece portion, and the via hole is provided to permit the fastening member on the sliding piece to penetrate, and a through hole is disposed on the elastic piece portion, and the through hole is correspondingly fit to the push member and correspondingly penetrated by the buckle block;

wherein the pressing member is correspondingly disposed to an exterior side of the fastening elastic piece, and a push block is disposed on an inner wall surface of the pressing member, and the push block passes through the through hole of the elastic piece portion, and the push block has an inclination surface, and the inclination surface correspondingly leans against the push member, and the push member is pushed when the pressing member is pressed to move toward inside so that the sliding piece moves toward the second end of the sliding groove, and at least one locking hole is further disposed on the inner wall surface of the pressing member, and the locking hole is correspondingly locked to the fastening member on the sliding piece;

wherein the elastic member is correspondingly disposed to the second end of the sliding groove, and an elastic end of the elastic member correspondingly leans against the sliding piece.

12. The hard drive box as recited in claim 11, wherein the main frame is a long rectangular frame.

13. The hard drive box as recited in claim 11, wherein a hollow portion is disposed at a center of the main frame, and a plurality of receiving pieces protrudes around a peripheral wall of the hollow portion to receive a hard drive at the hollow portion.

14. The hard drive box as recited in claim 13, wherein a plurality of fastening holes pass through two side walls of the main frame so that the fastening member passes through the fastening hole to fasten the hard drive set in the hollow portion.

15. The hard drive box as recited in claim 11, wherein at least one fastening aperture is disposed on the first end of the sliding groove, and at least one lock hole is disposed on an inner end of the fastening elastic piece, and the lock hole corresponds to the fastening aperture of the first end of the sliding groove and is passed by at least one fastening member to fasten the fastening elastic piece at the first end of the sliding groove.

16. The hard drive box as recited in claim 11, wherein at least one fastening aperture is correspondingly disposed on the second end of the sliding groove, and at least one locking hole is disposed on the elastic member, and the locking hole corresponds to the fastening aperture of the second end of the sliding groove and is passed by at least one fastening member to fasten the elastic member at the second end of the sliding groove.

17. The hard drive box as recited in claim 11, wherein the engaging member is a long plate body.

18. The hard drive box as recited in claim 11, wherein the flexible member is a torque spring.

19. The hard drive box as recited in claim 11, wherein the fastening elastic piece is a sheet material that is bent at an intermediate section.

20. The hard drive box as recited in claim 11, wherein a concave opening is disposed on the push member to permit the push block to enter the push member.

* * * * *